(12) United States Patent
Lambert

(10) Patent No.: US 10,111,500 B2
(45) Date of Patent: Oct. 30, 2018

(54) SELF-ALIGNING, QUICK CONNECT AND DISCONNECT MAGNETIC END CONNECTORS

(71) Applicant: Brian Lambert, East Wenatchee, WA (US)

(72) Inventor: Brian Lambert, East Wenatchee, WA (US)

(*) Notice: Subject to any disclaimer, the term of this patent is extended or adjusted under 35 U.S.C. 154(b) by 0 days.

(21) Appl. No.: 15/806,152

(22) Filed: Nov. 7, 2017

(65) Prior Publication Data

US 2018/0125173 A1    May 10, 2018

Related U.S. Application Data

(60) Provisional application No. 62/418,939, filed on Nov. 8, 2016.

(51) Int. Cl.
*A44B 11/28*    (2006.01)

(52) U.S. Cl.
CPC .......... *A44B 11/28* (2013.01); *A44D 2200/10* (2013.01); *A44D 2203/00* (2013.01)

(58) Field of Classification Search
CPC ...................................................... A44B 11/28
See application file for complete search history.

(56) References Cited

U.S. PATENT DOCUMENTS

| | | | |
|---|---|---|---|
| 431,548 A | 7/1890 | Bradley | |
| 2,615,227 A * | 10/1952 | Hornik | A44C 5/2071 24/303 |
| 3,293,714 A * | 12/1966 | Shafer | A44B 11/2596 24/303 |
| 3,376,616 A * | 4/1968 | Kaczorowski | A44B 11/258 24/303 |
| 3,589,341 A * | 6/1971 | Krebs | A01K 27/005 119/865 |
| 5,050,276 A * | 9/1991 | Pemberton | A44C 5/2076 24/303 |
| 6,101,688 A | 8/2000 | Marchesi | |
| 6,292,985 B1 * | 9/2001 | Grunberger | A44B 11/2592 24/303 |
| 6,505,385 B2 | 1/2003 | Grunberger | |
| 6,591,462 B2 | 7/2003 | Fuhrman | |
| 6,606,767 B2 | 8/2003 | Wong | |

(Continued)

OTHER PUBLICATIONS

Applied Magnets—www.magnets4less.com—Plano Texas USA 800-379-6818.

*Primary Examiner* — David M Upchurch
(74) *Attorney, Agent, or Firm* — Dean Craine, P.S.

(57) ABSTRACT

Self-aligning, durable quick connect strap end connector system that includes a pair of identical end connectors configured to slide together and interconnect. Each end connector includes a body with a strap bar and strap slot formed on the body's proximal end. The body includes a narrow section and a lip section that extends downward and rearward. The lip section includes an abutment surface transversely aligned with the body's longitudinal axis. Located adjacent to the abutment surface is a void area configured to receive the lip section on a second end connector longitudinally aligned with said first end connector. At least one projecting element extends from the abutment surface on said first end connector and fits into a hole formed on the abutment surface of the second end connector. Mounted on each abutment surface is at least one magnet that generate a magnetically attractive force between the two end connectors.

4 Claims, 7 Drawing Sheets

(56) References Cited

U.S. PATENT DOCUMENTS

| | | |
|---|---|---|
| 6,622,349 B2 | 9/2003 | Wong |
| 6,804,865 B2 | 10/2004 | Grunberger et al. |
| 6,857,169 B2 | 2/2005 | Chung |
| 7,154,363 B2 | 12/2006 | Hunts |
| 7,955,156 B2 | 6/2011 | Toht et al. |
| 8,359,716 B2 | 1/2013 | Fiedler |
| 8,464,403 B2 | 6/2013 | Fiedler |
| 8,800,117 B2 | 8/2014 | Fiedler |
| 9,049,894 B2 * | 6/2015 | Wong ................ A41F 1/002 |
| 9,668,551 B2 * | 6/2017 | Sanchez-Valenzuela ............... A44C 5/2076 |
| 2002/0112323 A1 * | 8/2002 | Nire .................. A41F 1/002 24/303 |
| 2003/0229974 A1 | 12/2003 | Zemer |
| 2007/0028429 A1 | 2/2007 | Ishida |
| 2008/0209693 A1 | 9/2008 | Zucker-Pinchoff |
| 2011/0179604 A1 * | 7/2011 | Desser ............ A44C 5/2076 24/303 |
| 2012/0255144 A1 * | 10/2012 | Gaudillere ......... A44B 11/266 24/303 |
| 2013/0111710 A1 | 5/2013 | Hunts |
| 2014/0130544 A1 | 5/2014 | Sanchez Valenzuela |
| 2014/0182088 A1 | 7/2014 | Roberts et al. |
| 2014/0277103 A1 * | 9/2014 | Esposito .......... A44B 11/258 606/203 |
| 2016/0003269 A1 * | 1/2016 | Russell-Clarke ...... A41F 1/002 24/303 |
| 2016/0007697 A1 | 1/2016 | de Jong |
| 2016/0037868 A1 * | 2/2016 | Lambert ........... A45C 13/1069 24/303 |
| 2016/0363142 A1 | 12/2016 | Yeung et al. |
| 2017/0138374 A1 | 5/2017 | Simmonds et al. |

\* cited by examiner

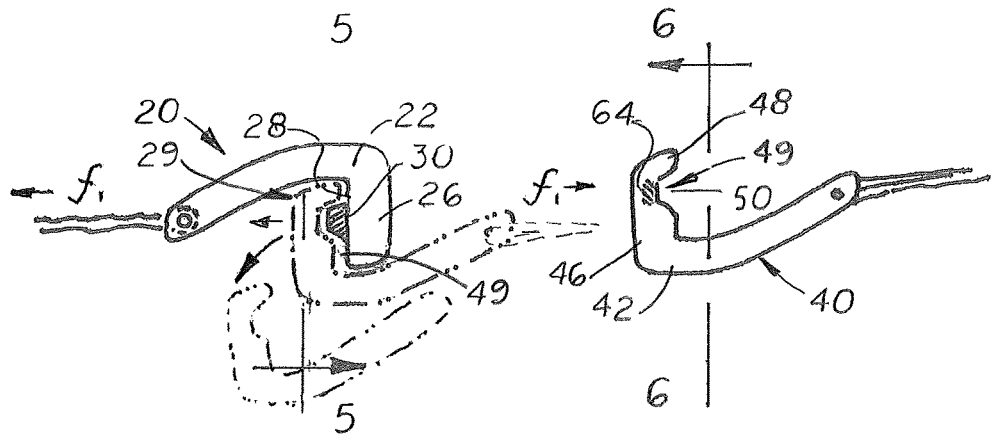
FIG. 3    FIG. 4
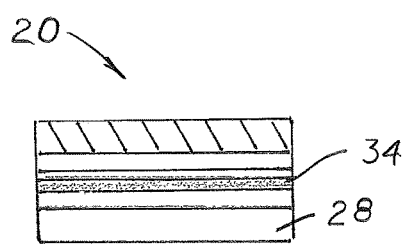    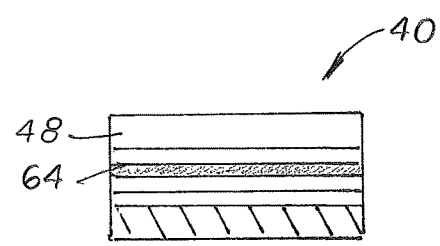
FIG. 5    FIG. 6
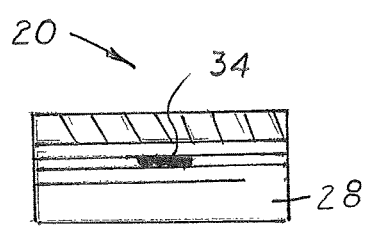    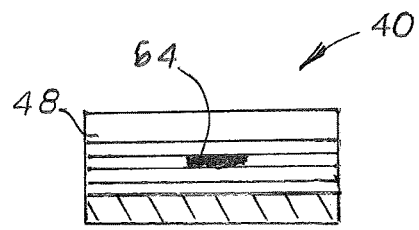
FIG. 7    FIG. 8

SELF-ALIGNING, QUICK CONNECT AND DISCONNECT MAGNETIC END CONNECTORS

This U.S. utility patent application is based on U.S. provisional patent application (Application No. 62/418,939) filed on Nov. 8, 2016.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention relates to belts and straps with opposite end connectors that connect to encircle, and more particular to collars, belts and straps that use end connectors that self-align easily connected and disconnected, and less susceptible to breaking or disconnection when exposed to excessive forces.

2. Description of the Related Art

Ideally, a dog collar should be should be sufficiently strong to withstand the pulling forces exerted by a leash or tether line, sufficiently wide so it will not slide over the dog's head, and sufficiently loose so that it does not strangle the dog when relaxed or when tethered to a leash. Ideally, the buckles and end connectors used on a neck collar should have a relatively low profile so they do not snag objects the animal may brush against.

A type of low profile end connectors commonly used on a neck collar or leash are commonly called 'quick release' slide end connectors. 'Quick release' slide connectors include a plastic male slide end connector and a plastic female slide end connector which can be easily aligned with the fingers and easily interconnected by forcing them together. The male slide end connector includes flexible arms that bend inward when the male end slide connector is initially pushed into the female connector. The flexible arms then automatically bend outward and snap into two slots formed on opposite sides of the female slide end connector to connect the slide end connectors together. To disconnect the male slide end connector from the female slide end connector, the user must simultaneously force the two slide end connectors together, press the portion of the two flexible arms extending through the slots inward until they disengage from the slots.

One drawback with 'quick release' slide end connectors mentioned above is that flexible arms will break or forced inward and disengage the slots when excess force is exerted on the end connectors.

What is needed is needed is an alternative pair of end connectors that also have a low profile, durable, and less likely to break or disengage when excess force is exerted on the end connectors.

SUMMARY OF THE INVENTION

The above-mentioned objects are met by a self-aligning strap end connector system that includes a first end connector and a second end connector affixed to the ends of a single strap, such as a neck collar, or the ends of two straps intended to be temporarily connected.

Each first and second end connector includes a wide body continuous first surface and a second surface tactilely distinguishable from the first surface. The wide body includes a strap bar and strap receiving slot formed on its proximal end. Formed near the opposite distal end of the wide body is a thick, transversely aligned lip section. The lip section extends downward from the wide body and curves inward and forms an abutment surface. The abutment surface is perpendicularly and transversely aligned with wide body's longitudinally axis. The section of the wide body adjacent to the abutment surface is narrow and curves and intersects with the proximal end. A wide void area is slightly larger than the lip section and is formed centrally and under the narrow section The proximal ends on the first and second end connectors are attached to the opposite ends of a neck collar, a single strap or to the ends of two separate straps. The first and second surfaces on the two end connectors are oriented on opposite directions so the lip section on one end connector overlaps the lip section on the other end connector and drops into the two void areas. When the lip sections overlap, the two abutment surfaces of the two end connectors are parallel and abut.

Formed or attached to the abutment surface on the first end connector is at least one projecting element with a center axis perpendicularly aligned with the first end connector's abutment surface. Formed or attached to the abutment surface on the second end connector is a receiver hole slightly larger in diameter than the projecting element. The location, orientation, diameter, and depth of the receiver hole on the abutment surface on the second end connector are enough so the projecting element slides into the receiver hole enabling the abutment surfaces to be aligned parallel and abut. In one embodiment, there are two pairs of projecting elements and receiver holes on opposite sides of the end connectors.

Attached to each abutment surface on each end connector is a magnet. The magnets on the two end connectors are longitudinally aligned with their poles oriented in opposite directions so they attract when brought in close proximity. In another embodiment, the magnets are small circular or square disc magnets partially imbedded into the abutment surfaces enabling the projecting elements to engage the receiving holes.

In some embodiments presented, the end connectors include hook members that extends longitudinally and faces inward towards the proximal end of the wide body. During use, the two hook members engage to lock the end connectors together.

During assembly, the end connectors are oriented, so their distal ends overlap, and the lip sections fits into the void areas on the opposite end connectors. The abutment surfaces on the end connectors are parallel and resist longitudinally directed pulling forces on the end connectors. The two projecting elements on one end connector extend into receiving holes formed on the opposite end connector. The projecting elements and receiver holes keep the end connectors longitudinally aligned but resist side-to-side movement and up/down movement of the two abutment surfaces. The two magnets hold the two abutment surfaces together when little no pulling force is exerted on the two end connectors.

THE DRAWINGS

FIG. 3 is a side elevational view of the first end connector showing the downward movement of the second end connector relative to the first end connector.

FIG. 4 is a side elevational view of the second end connector.

FIG. 5 is a sectional rear elevational view taken along line 5-5 in FIG. 3.

FIG. 6 is a sectional rear elevational view taken along line 6-6 in FIG. 4.

FIG. 7 is a sectional rear elevational view similar to the view show in FIG. 5 showing a disc magnet used in place of an elongated magnet.

FIG. 8 is a sectional rear elevational view like the view show in FIG. 6 showing a disc magnet used in place of an elongated magnet.

DESCRIPTION OF THE PREFERRED EMBODIMENT(S)

Figure 1:
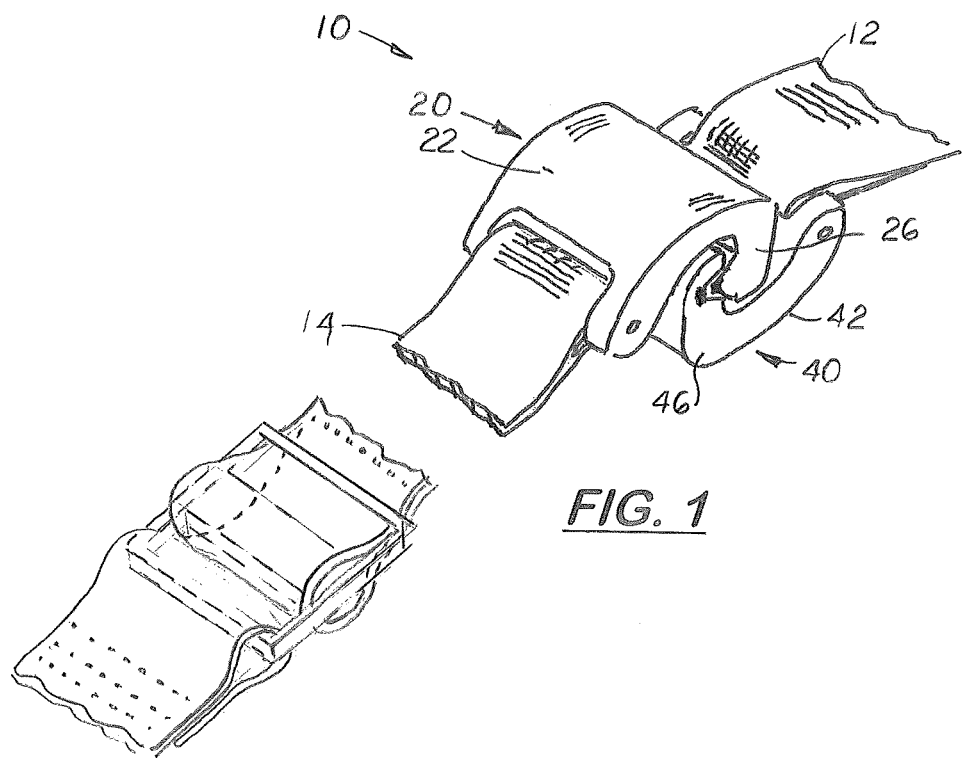
FIG. 1 is a top perspective view of a self-aligning strap end connector system that includes a pair of connectors attached to the opposite ends of a single strap or dual straps and connected.
Figure 2:
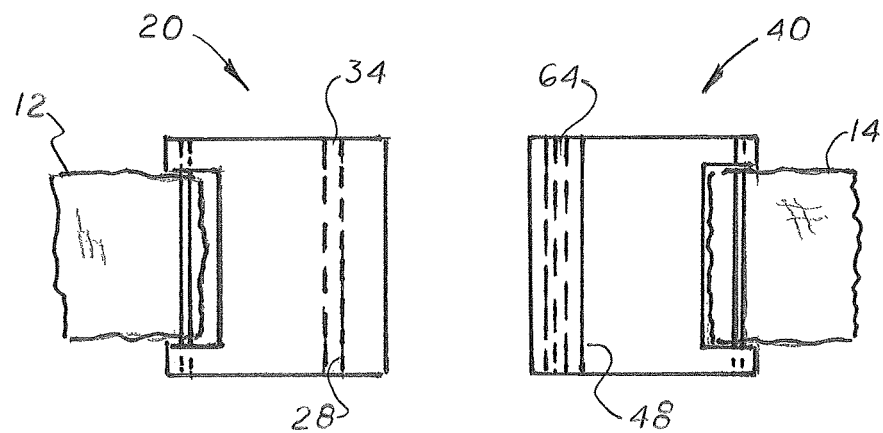
FIG. 2 is a side elevational view of the two end connectors and straps shown in FIG. 1.

Referring to the FIGS. 1-10, there is shown a set of end connectors 20, 40 affixed to the ends 12, 14 of a single strap or two straps intended to be temporarily joined. Each end connector 20, 40 includes a rigid body 22, 42, and a lip section 26, 46, respectively, formed on its distal end. The first and second end connectors 20, 40 are attached to the ends 12, 14 of the straps so the lip sections 26, 46 are aligned in opposite direction as shown in FIGS. 1 and 3. As shown in FIGS. 3 and 4, adjacent to each lip section 26, 46 is a center void 29, 49, respectively. Formed on each lip section 26, 46 is an inward facing, transversely aligned abutment surface 28, 48, respectively. During use, the end connectors 20, 40 are longitudinally aligned and pressed together so the lip sections 26, 46 overlap until the abutment surfaces 28, 48 disposed into the voids 29, 49 formed on the adjacent end connector 20, 40 and parallel.

Formed or attached to the abutment surface 28 on the first end connector 20 is an elongated projecting element 30 with a center axis perpendicularly aligned with the adjacent abutment surface 28. Formed or attached to the abutment surface 48 on the second end connector 40 is a receiver hole 50 (see FIG. 4). The receiver hole 50 is complimentary in shape and size with the projecting element 30 so the projecting element 30 engages the receiver hole 50 when the two abutment surfaces 28, 48 are aligned and registered.

Attached to the projecting element 30 and inserted into each receiver hole 50 are two magnets 34, 64, respectively. The magnets 34, 64 are oriented with their magnetic poles in opposite directions so they attract when placed in close proximity. In one embodiment in FIGS. 2-5, the magnets 34, 64 are elongated bars that extend longitudinally substantially the entire over the projecting element 30 or the slot 50. In another embodiment, shown in FIGS. 7 and 8, the magnets 34, 64 are small circular or square disc magnets.

Figure 9:
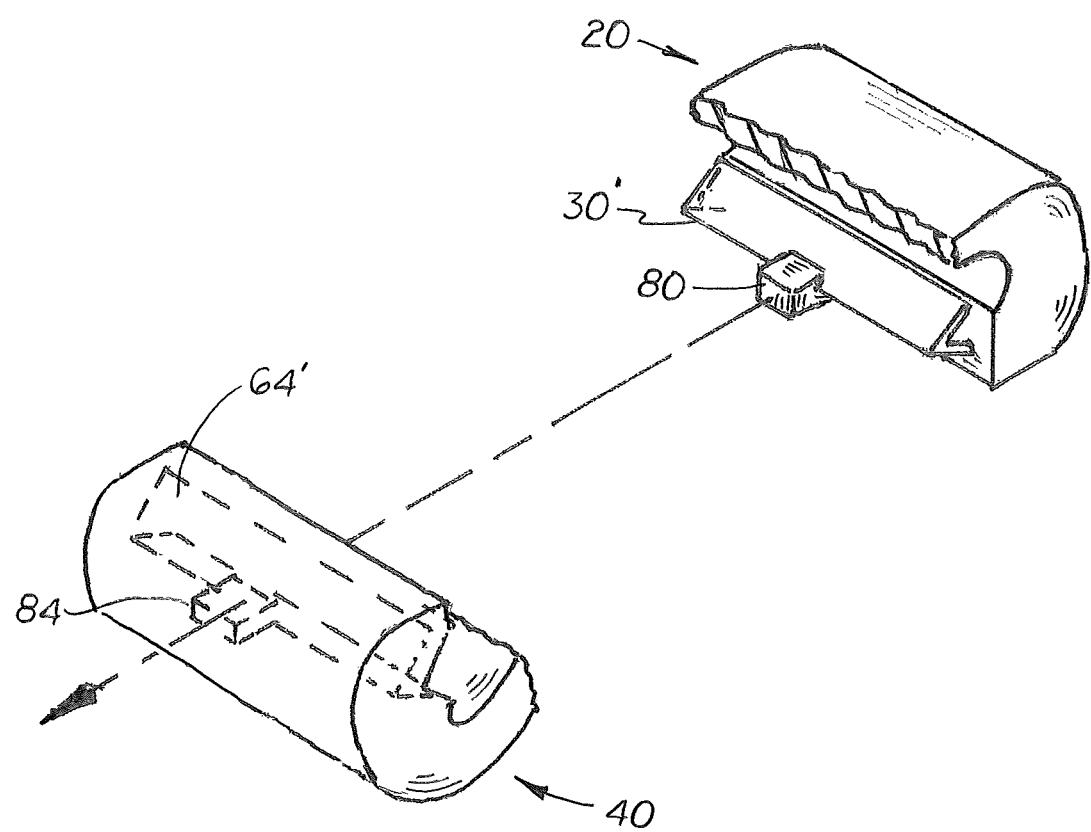
FIG. 9 is an illustration showing a partial perspective view of the first end connector with an elongated, V-shaped magnet attached to the projecting surface with a center peg and a second end connector with a complimentary, V-shaped receiver made of magnetic material or made of ferrous material each magnetically attracted to the V-shaped magnet.
Figure 10:
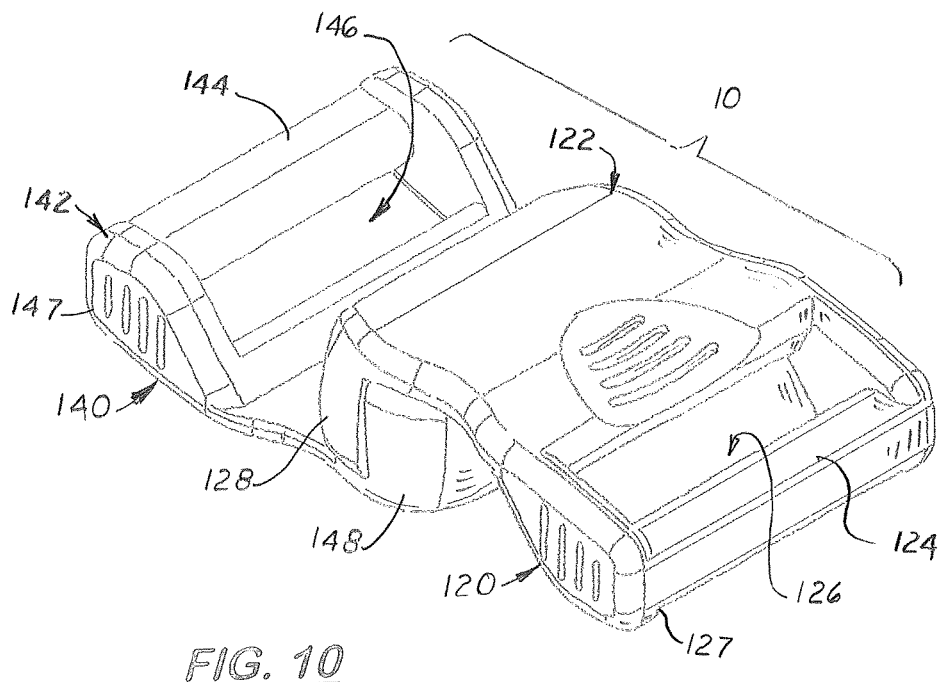
FIG. 10 is a perspective view of another embodiment of two end connectors.
Figure 11:
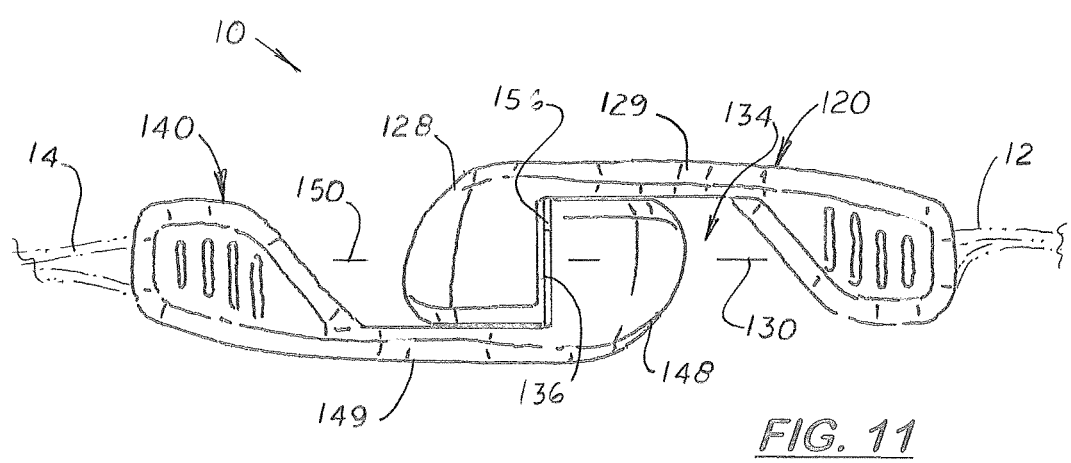
FIG. 11 is a side elevational view of the two end connectors shown in FIG. 10.
Figure 12:
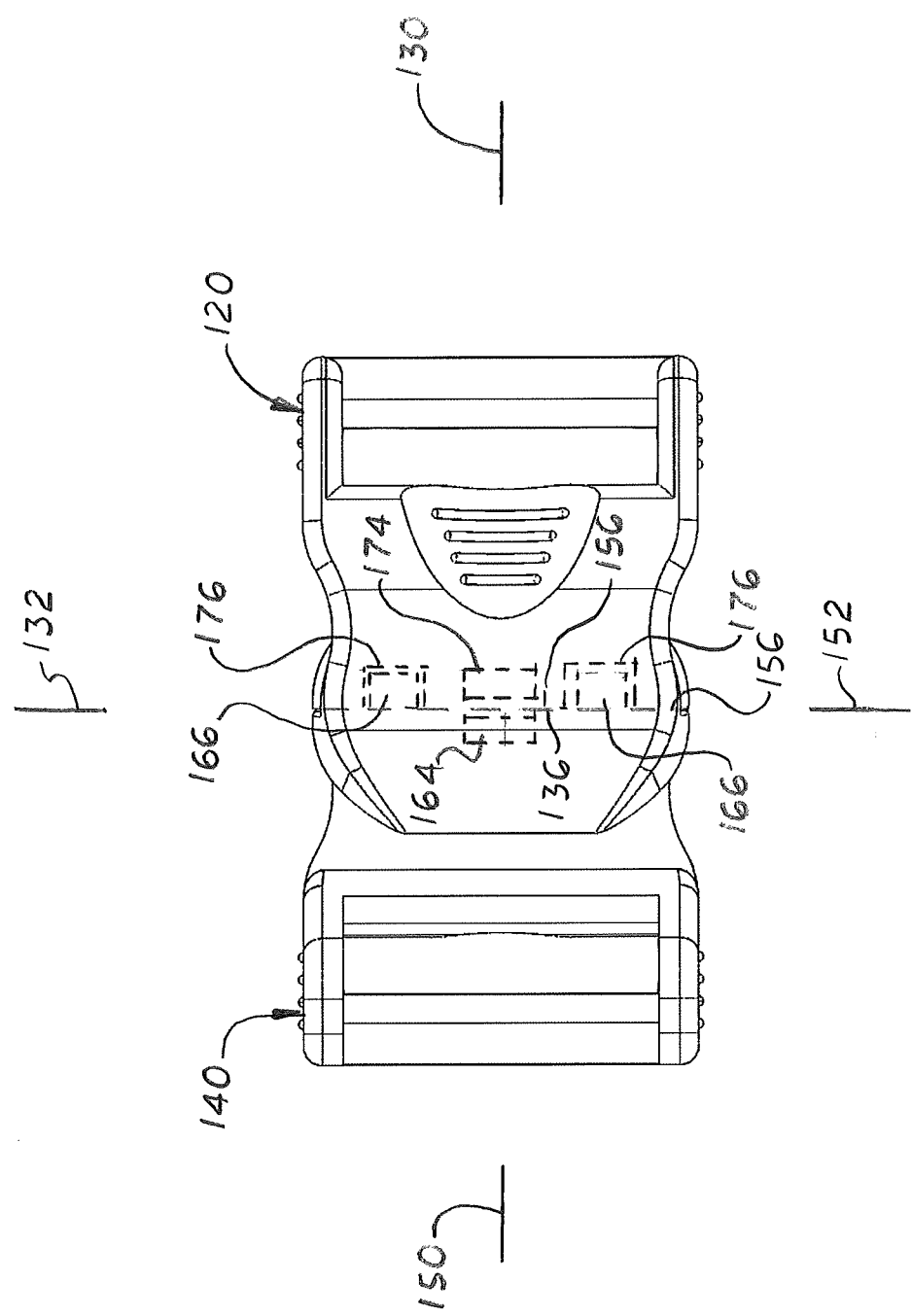
FIG. 12 is a top plan view of the two end connectors shown in FIG. 10.
Figure 13:
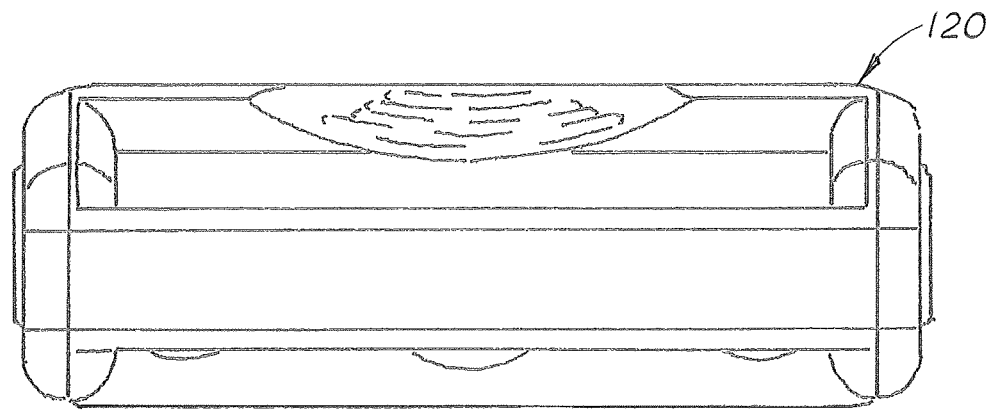
FIG. 13 is an end elevational view of the end connectors shown in FIG. 10.
Figure 14:
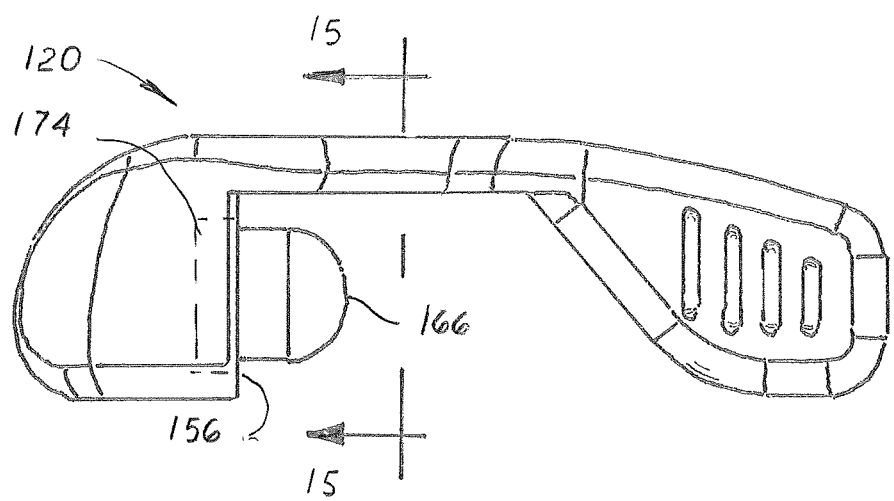
FIG. 14 is a side elevational view of an end connector showing the relative location of the projecting element and the magnet on the abutment surface.
Figure 15:
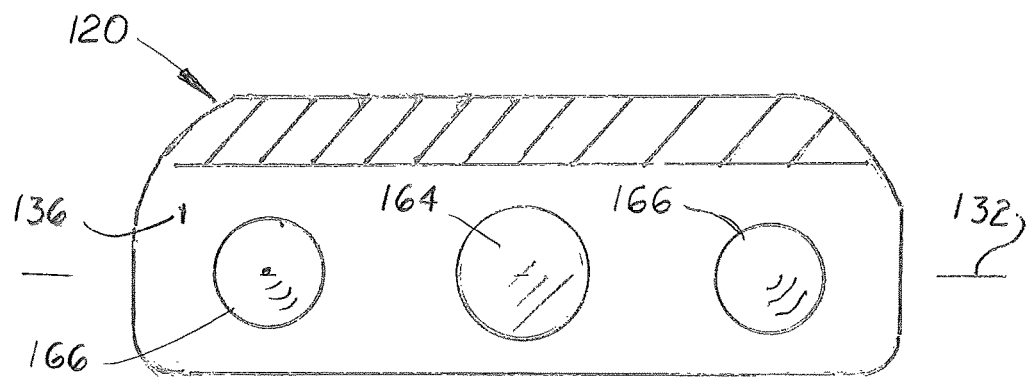
FIG. 15 is a sectional view of the end connector taken along line 15-15 in FIG. 14.
Figure 16:
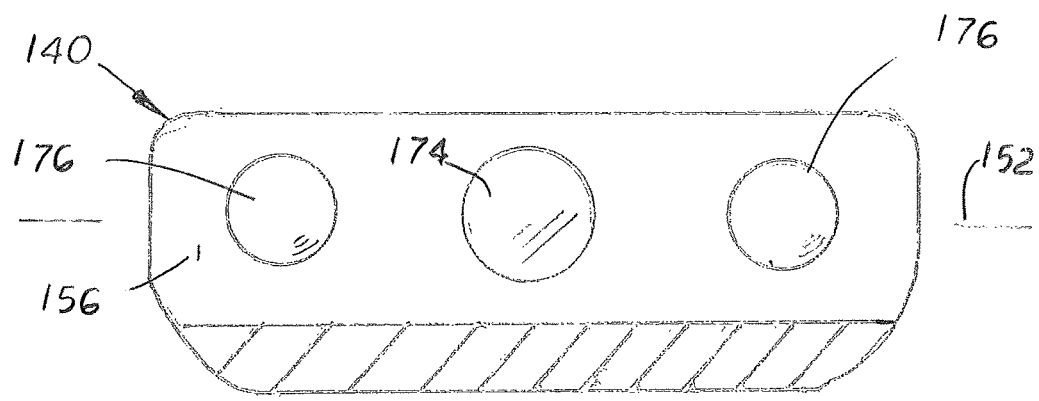
FIG. 16 is a sectional view of the opposite end connector showing the two holes and a center magnet.

FIG. 9 is an illustration showing a partial perspective view of the first end connector 20 with an elongated, V-shaped magnet 30' attached to the projecting surface with a center peg 80 attached thereto and showing second end connector 40 with a complimentary, V-shaped receiver 64' made of magnetic material or made of ferrous material each magnetically attracted to the V-shaped magnet 30' and showing a peg hole 84 formed on the receiver 64' configured to receive the peg 80 and prevent lateral movement of the first and second end connectors.

FIGS. 10-15 show another embodiment of the system 10 that uses a pair of modified first and second end connectors, 120, 140. Each first and second end connector 120, 140 includes a rigid body 122, 142 with a strap bar 124, 144, and a strap receiving slot 126, 146, formed on its proximal end 123, 143, respectively. Formed on the distal end 127, 147 of each end connector 120, 140 is a transversely aligned lip section 128, 148, respectively. Formed on the rigid body 122, 142 located above the lip section 128, 148 is a narrow section 129, 149, respectively. Each end connector 120, 140 includes a longitudinal axis 130, 150 and a transverse axis 132, 152, respectfully. The lip section 128, 148 is perpendicularly aligned with the longitudinal axis 130, 150 and parallel with the wide body's transverse axis 132, 152, respectively. Formed on each lip section 128, 148 is a transversely aligned abutment surface, 136, 156, that faces the proximal end of the body 124, 144, respectively.

Like the first embodiment shown in FIGS. 1-9, the proximal ends on the first and second end connectors are attached to the opposite ends of the single strap or to the ends 12, 14 of two separate straps. The inside surface of each end connector 120, 140 between the rigid body 122, 142 and the lip section 128, 148 curves inward forming a wide void area 134, 154 configured to receive the lip section 128, 148 on the adjacent end connector 120, 140, respectively. The widths and lengths of the two abutment surfaces 136, 156 are identical. The widths and lengths of the two abutment surfaces 136, 156 are also nearly identical to the wide void areas 134, 154 enabling the two end connectors 120, 140 when oriented in opposite directions, to be longitudinally aligned and their distal ends overlapping. When the distal ends overlap, the abutment surfaces 136, 156 on the two end connectors 120, 140 abut and prevent movement of the end connectors 120, 140 towards their proximal ends.

Formed or attached to the abutment surface 136 on the first end connector 120 is at least one projecting element 166 perpendicularly aligned with the abutment surface 136. Formed or attached to the abutment surface 156 on the second end connector 140 is a receiver hole 176. The receiver hole 176 is complimentary in shape and in size with the projecting element 166 so the projecting element 166 fits into and engages the receiver hole 176. In one embodiment, there are two pairs of projecting elements 166 and receiving holes 176 on opposite sides of the end connectors, 120, 140, respectively.

Attached to the abutment surface 136, 156 on each end connector 120, 140 is a magnet 164, 174, respectively. The magnets 164, 174 on the two end connectors 120, 140 are longitudinally aligned with their poles oriented in opposite directions so they attract when brought with ¼ inches of each other. In one embodiment, the magnets 164, 174 are disc magnets with outer surfaces flush or even with the abutment surfaces 136, 148, respectively.

During assembly, the end connectors 120, 140 are oriented so their distal ends overlap. The top and bottom surfaces of the end connectors are rotated so the lip sections 128, 148 fits into the void areas 134, 154 on the opposite end connector. The abutment surfaces 136, 156 on the end connectors 120, 140 are parallel and resist longitudinally directed pulling forces on the end connectors 120, 140. The two projecting elements 166 on the second end connector 140 extend into holes 160 formed on the first end connector 120 and resist side-to-side movement and up/down movement of the two abutment surfaces 136, 156. The two magnets 166, 166 hold the two abutment surfaces 136, 156 together when little no pulling force is exerted on the two end connectors 120, 140.

In compliance with the statute, the invention described has been described in language more or less specific on structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A self-aligning strap end connector system, comprising,
   a. a first end connector that includes a body with a distal end, a proximal end, a longitudinal axis, a first surface and a second surface, a strap bar and a strap slot formed on said body near said proximal end, said body includes a lip section near said distal end that and includes an abutment surface perpendicularly and transversely aligned with said longitudinal axis, said body includes a void area adjacent to said abutment surface configured to receive a lip section on a second end connector when said second end connector is longitudinally aligned with said first end connector;
   b. at least one projecting element formed on said abutment surface of said first end connector, said projecting element being perpendicularly aligned with said abutment surface of said first end connector;
   c. at least one magnet located on said abutment surface on said first end connector;
   d. a second end connector that includes a body with a distal end, a proximal end, a longitudinal axis, a first surface and a second surface, a strap bar and a strap slot formed on said body near said proximal end, said body includes a lip section formed near said distal end, said lip section includes an abutment surface transversely aligned with said longitudinal axis, said body includes a void area adjacent to said abutment surface configured to receive said lip section on said first end connector when said first end connector is longitudinally aligned with said second end connector and said abutment surfaces are aligned parallel and abutted;
   e. at least one receiver hole formed on said abutment surface of said second end connector, said receiver hole configured to receive said projecting element on said first end connector when said first end connector and said second end connector are longitudinally aligned and said abutment surface on the first end connector and said abutments surface on said second end connector are parallel and abut and configured resist side-to side movement of said end connectors; and
   f. at least one magnet located on said abutment surface of said second end connector configured to be magnetically attracted to said magnet on said abutment surface of said first end connector when said first end connector and said second end connector are longitudinally aligned and said projecting element is inserted into said receiver hole.

2. The self-aligning strap end connector, as recited in claim 1, wherein said magnet on said first end connector is flush mounted on said abutment surface on said first end connector and said magnet on said second end connector is flush mounted on said abutment edge on said second end connector.

3. The self-aligning strap end connector, as recited in claim 1, wherein one said magnet is mounted on said abutment surface on said first end connector and one said magnet is mounted on said abutment surface on said second end connector and two projecting elements are mounted on the first end connector on opposite sides of said magnet and two receiver holes are formed on said abutment surface on the second end connector on opposite sides of said magnet.

4. The self-aligning strap end connector, as recited in claim 3, wherein said magnet on said first end connector is flush mounted on said abutment surface on said first end connector and said magnet on said second end connector is flush mounted on said abutment edge on said second end connector.

* * * * *